Figure 1:
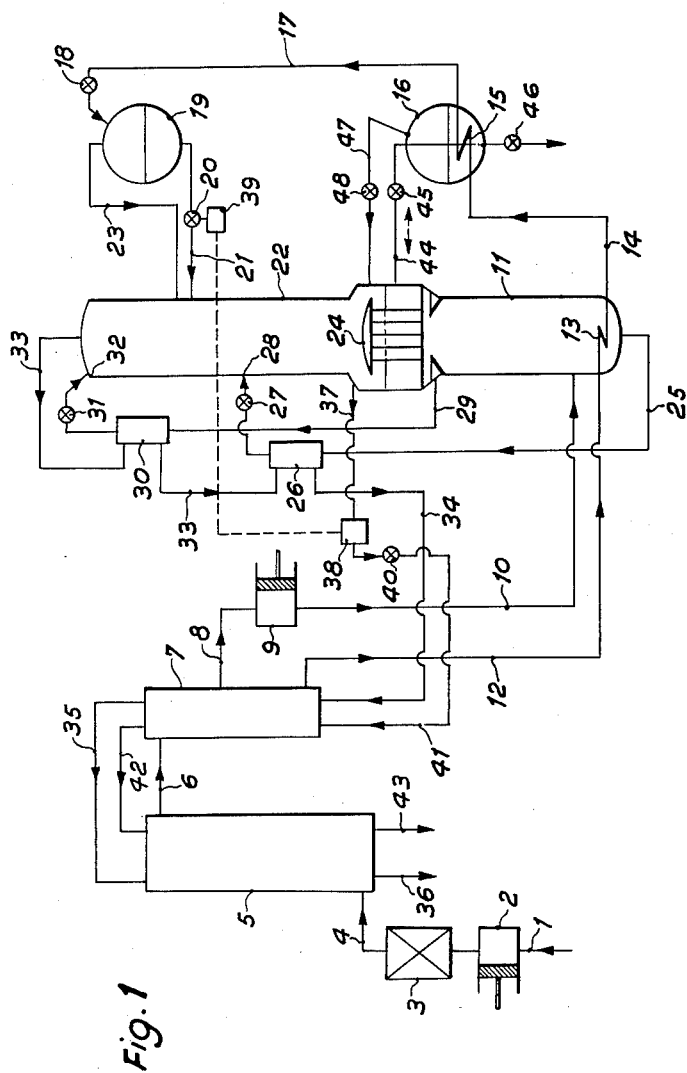

INVENTOR
MAURICE GRENIER

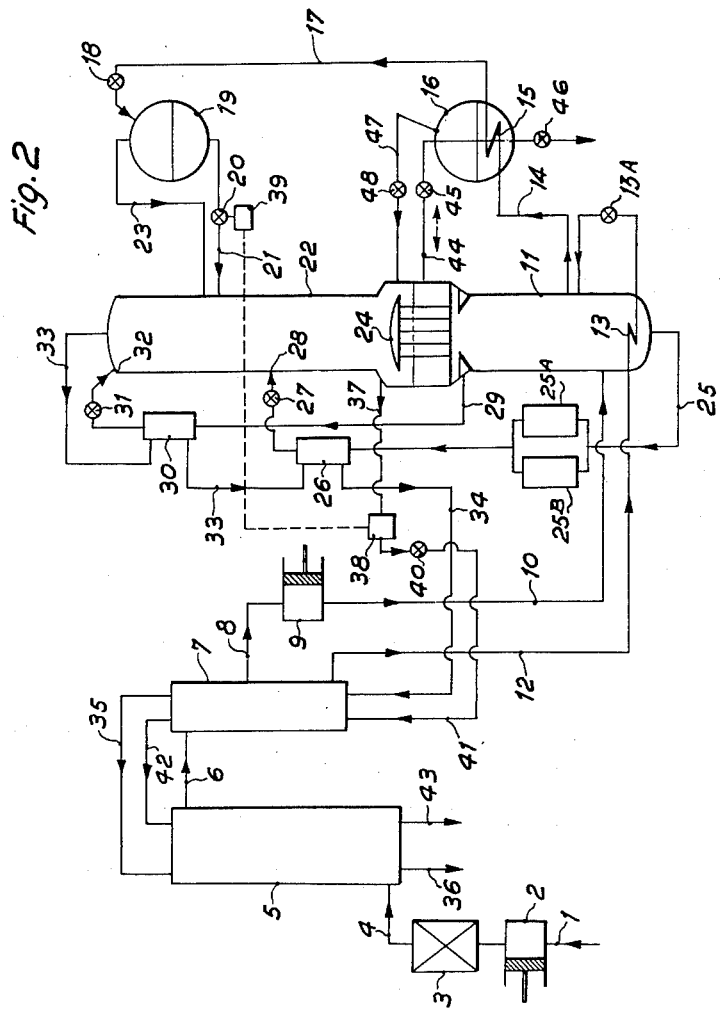

United States Patent Office 3,056,268
Patented Oct. 2, 1962

3,056,268
METHOD FOR STABILIZING THE OPERATION OF A PLANT FOR THE LOW TEMPERATURE RECTIFICATION OF GASEOUS MIXTURES
Maurice Grenier, Paris, France, assignor to l'Air Liquide, Societe Anonyme pour l'Etude et l'Exploitation des Procedes Georges Claude, Paris, France
Filed Feb. 3, 1958, Ser. No. 713,001
Claims priority, application France Feb. 13, 1957
12 Claims. (Cl. 62—19)

The present invention relates to a method for stabilizing the operation of a plant for the low temperature rectification of a gaseous mixture, in which a relatively high boiling component is withdrawn in the gaseous state. It is more particularly applicable to the plants for low temperature rectification of air for the production of gaseous oxygen and it will be described hereinafter for sake of clarity in this latter application although it is of course not limited thereto.

It is a well known fact that the requirement for gaseous oxygen produced in air-rectifying plants is often highly variable and it is even sometimes reduced to zero, whereas the air-rectifying plant operates under satisfactory conditions only for an unvarying production. This is true both for plants which serve for the production of oxygen under low pressure in view of metallurgical operations which are generally non-continuous and also for plants intended for the filling of storage containers under a high pressure for which the provision of empty containers is sometimes insufficient.

A method which has already been used so as to prevent any stoppage of the operation of a rectifying plant or its operation at a reduced capacity and, consequently, under poor conditions, consists in storing the gaseous oxygen either in gas-holders under atmospheric pressure or else in containers subjected to a variable pressure. These apparatus are however bulky and if the built up production rises transiently beyond their capacity, one is bound to discharge the oxygen to the atmosphere.

Another method consists in producing oxygen in the liquid state and in storing it in this state after which it is vaporized in accordance with requirements in a different plant. This last solution leads to certain advantages, in particular the easy storing under a reduced volume, but it shows the serious drawback of requiring a much larger power expenditure, since it is necessary to provide additionally the cold required for the liquefaction of oxygen which leads to a substantially higher power expenditure.

Generally speaking, the method according to the invention allows stabilizing the operation of a plant for the liquefaction and rectification of a gaseous mixture such as air at a low temperature without requiring any higher power expenditure. It is characterized in that a liquid fraction, the composition of which is about that of the mixture, is sent at least partly into a first store which feeds with a variable throughput a rectification stage of the plant, preferably the last stage, while an exchange of relatively high-boiling component in the liquid state between the last rectification stage of the plant and a second store is performed with a variable throughput, and the variable throughputs of the liquids are adjusted so as to maintain at a substantially constant value the total cold content of the two stores under the form of liquefied gases.

The liquid fraction may be either a liquefied part of the mixture to be separated, or a liquid taken from a rectification column before the last one, when the mixture is rectified in at least two rectifying columns.

In the first hypothesis to be considered, when the requirement for the less volatile component in a gaseous state ceases or drops under the normal, all or part of this same component is sent in the liquid state into the corresponding store and the bringing in of a larger cold supply required for the proper operation of the last rectification stage of the plant is ensured by increasing the throughput of the liquefied mixture introduced into the plant by a corresponding amount. When, however, the requirement for the less volatile component in the gaseous state rises above the normal, the necessary throughput of said component in the liquid state is returned from the store into the last rectification stage and the amount of mixure in the liquid state introduced into the plant is reduced so that the total amount of cold sent from the system of two stores into the rectifying plant remains substantially the same. The amount of liquid mixture introduced into the first store remains substantially constant during this time, so as not to disturb the operation of he liquefaction apparatus and possibly of the preceding rectification stages.

This gives the rectifying plant a large adaptability through the mere incorporation of two stores of liquefied gas inside heat-insulated containers. On the other hand, in the case of a shut-down of the plant, the starting is made more rapid by reason of the presence of a store of liquid mixture which may be poured into the plant, in order to accelerate its starting.

Furthermore, the method according to the invention allows a very simple and efficient adjustment of the purity of the less volatile component such as oxygen which is removed in the gaseous state from the rectifying plant. It is sufficient, as a matter of fact, to adjust the admission of the gaseous mixture in the liquid state into the last recifying column, according to the purity of the less volatile component, as recorded at the output end of the column, by reducing, for instance, the throughput at the entrance when the purity decreases. It is possible to use for this purpose an automatic control apparatus of a known type.

The rectifying plant may include one or more columns; in the most usual case of the separation of air in two rectifying columns under different pressures, which are connected by a condenser and vaporiser with a removal of the oxygen from the low pressure column, the container of liquid oxygen and preferably the container of liquid air communicate with this latter column. It should be remarked that if the container of liquid air communicates with the low pressure column, the operation of the high pressure column is not at all disturbed then by the modifications brought to the operation of the low pressure column. As a matter of fact, the amount of impure nitrogen condensed in the condenser and also the amounts of liquid enriched with oxygen and of impure liquid nitrogen sent into the low pressure column remain the same.

One might consider in the above case of a rectifying plant with a double column the possibility of storing instead of liquid air or a liquid of about the same composition, one of the other liquids sent from the high pressure column into the low pressure column, to wit the liquid enriched with oxygen, or the impure liquid nitrogen. It is easy to ascertain that the storing of a liquid of about the same composition as air is by far the most advantageous solution since neither of the two other solutions allows preventing losses of oxygen in either of the two cases of a disturbance with reference to normal production.

In the case of the storing of liquid enriched with oxygen, it is necessary, when the production of gaseous oxygen is reduced or cut out and the oxygen is sent in a liquid state into the container, to increase the amount of enriched liquid introduced into the low pressure column; the amount of oxygen introduced in this latter liquid becomes then substantially higher than the amount extracted in a liquid condition. A certain amount of oxygen is drawn towards the upper end of the column with the nitrogen of which it reduces the purity and the oxygen yield is thereby decreased.

In the case of the storing of impure liquid nitrogen, it is when one wants to remove an amount of gaseous oxygen above normal by returning liquid oxygen from the container into the low pressure columns that a disturbance cannot be avoided, since it is then necessary to reduce the amount of liquid nitrogen introduced into the upper end of the low pressure column, which leads to reducing the reflux rate and, consequently, the efficiency of the separation.

There are described hereinafter by way of example, reference being had to the accompanying drawing, two plants for rectifying air at a low temperature, both including two columns under different pressures and providing for application of the method according to the invention.

In the plant of FIGURE 1, the liquefied air is directly sent into a container, wherefrom it is fed at a controlled rate into the low pressure rectification column.

In the plant of FIGURE 2, the liquefied air is introduced into the high pressure rectification column and a liquid fraction is withdrawn from the same column at a slightly higher level and fed to a container, wherefrom it is similarly fed at a controlled rate into the low pressure rectification column.

According to FIGURE 1, the air to be separated is sent through the pipe 1 into a compressor 2 which raises it to a moderate pressure, for instance an absolute pressure of 12 kg. per sq. cm. It is then purified of its impurities, chiefly moisture and carbon dioxide, inside an apparatus 3 of a known type, for instance through condensation of the moisture and absorption of the carbon dioxide by a caustic soda solution. The purified air is then sent through the pipe 4 into a heat exchanger 5 called the cooling exchanger inside which it is cooled through heat exchange with the gaseous products formed by the separation, nitrogen and oxygen. The air cooled down to about −80° C. passes then through the pipe 6 into the exchanger 7 called the liquefying exchanger inside which it is further cooled and partly liquefied through heat exchange with the same gases. A fraction of said air is removed from the middle of said exchanger at a temperature of about −150° C. and it is sent through the pipe 8 into an expansion engine 9 producing external work in which it is expanded down to about 5 kg. per sq. cm. and it is cooled down to about −173° C. It is fed then through the pipe 10 into the high pressure column 11. The other fraction of the air is liquefied at the lower end of the exchanger 7 and it is then sent through the pipe 12 into the heating coil 13 arranged at the lower end of the high pressure column 11 where it is sub-cooled. It passes then through the pipe 14 into a coil 15 housed inside a liquid oxygen storage container 16 to be described in detail hereinafter and beyond which it reaches through the pipe 17 and the valve 18 a liquid air storage container 19. A throughput of liquid air controlled by the valve 20 of which the opening is adjusted as a function of the purity of the gaseous oxygen produced by a metering apparatus 38 and a control apparatus 39 of known types, is introduced through the pipe 21 into the low pressure column 22. The air which may be vaporized inside the container 19 is introduced through the pipe 23 into this same column. Usually, the high pressure column 11 and the low pressure column 22 are in heat exchanging relationship through the condenser and vaporizer 24. The liquid enriched with oxygen obtained at the lower end of the high pressure column 11 is sent through the pipe 25 into the exchanger 26 where it is sub-cooled through heat exchange with the gaseous nitrogen produced by the separation and it expands then through the valve 27 down to the pressure of the column 22 and it is introduced into the latter at 28. Of the impure nitrogen condensed in the condenser 24, a fraction returns into the column 11 as a reflux, another fraction is collected and sent through the pipe 29 into the exchanger 30 where it is cooled through heat exchange with the separated gaseous nitrogen and it expands then through the valve 31 and is introduced at 32 at the head of the low pressure column 22.

The pure gaseous nitrogen evolved at the head of the column 22 is sent through the pipe 33 into the exchangers 30 and 26 in which it cools in succession the impure liquid nitrogen and the air enriched with oxygen as already mentioned and then it passes through the pipe 34 into the liquefying exchanger 7 whence it passes through the pipe 35 into the cooling exchanger 5 before it is exhausted at 36.

The gaseous oxygen is removed from the column 22 through the pipe 37. It passes through an analyzing apparatus 38 of a known type connected through automatic control means 39 with the valve 20 controlling the liquid air input of which it allows adjusting the opening as a function of its purity. Its flow is adjusted and may be interrupted by a valve 40. It passes then through a pipe 41 into the liquefying exchanger 7 and through the pipe 42 into the cooling exchanger 5 after it is sent into the utilization means through the pipe 43.

The oxygen removed in a liquid state is sent through the pipe 44 and the valve 45 to the container 16 which is provided with a valve 46 which allows removing a certain amount thereof if it is desired to use a fraction in a liquid state. A pipe 47 provided with a valve 48 allows returning the oxygen which may be vaporized inside the container into the column 22. When it is desired to return liquid oxygen from the container 16 into the column 22, it is possible to resort to a return pipe provided with a pump. The simplest method consists however in closing the valve 48 in the pipe 47 returning the oxygen vapours. The pressure rises then gradually inside the container 16 above the liquid which is urged back into the column through the pipe 44.

The plant shown in FIGURE 2 is generally similar to that of FIGURE 1, but the liquid air subcooled in coil 13 is expanded through a valve 13A and introduced into the high pressure column 11, while a liquid fraction is withdrawn from the same column at a slightly higher level—for instance, from the rectification plate just above that upon which comes in the liquid air—and sent through pipe 14, coil 15 and valve 18 into a container 19. In that way, there is fed from container 19 to the low pressure column 22 a liquid substantially free from any residual high-boiling impurities, such as acetylene, since such impurities are brought down in the pressure column by the downflowing liquid. The impurities collect in the liquid enriched with oxygen extracted from the lower end of the column and are separated therefrom in filters 25A, 25B of a known type.

What I claim is:

1. Apparatus for separating air by low-temperature liquefaction and rectification in at least two successive rectification columns in heat exchange relationship and supplying gaseous oxygen to a variable demand, comprising piping means and a control valve associated therewith for supplying the gaseous oxygen at the required rate, a liquid oxygen container, piping means and a control valve associated therewith for exchanging liquid oxygen between the liquid oxygen container and the lower part of one of the rectification columns wherefrom the gaseous oxygen is supplied, a liquid mixture container, piping means for feeding said liquid mixture into said liquid mixture container, and piping means and a control valve associated therewith for feeding said liquid mixture from said liquid mixture container into said rectification column.

2. Apparatus according to claim 1, wherein the piping means for feeding the liquid mixture into the liquid mixture container comprises a heat exchange coil within the liquid oxygen container.

3. Apparatus according to claim 1, further comprising piping means connecting the vapor spaces of said liquid oxygen container and said rectification column, and a control valve for disconnecting said vapor spaces.

4. In a method for separating a gaseous mixture comprising the steps of cooling said mixture, expanding part of said cooled mixture with external work, feeding said part of said cooled mixture to a rectification member, partly liquefying at least another part of said cooled mixture, feeding said other part of said cooled mixture, the composition of which is about that of said gaseous mixture, to a storage container of liquefied mixture of said gaseous mixture, feeding the liquefied mixture from said storage container through a variable member into said rectification member, supplying a higher-boiling component of the liquefied mixture in the gaseous state to a variable demand, exchanging said higher-boiling component in the liquid state between said rectification member and a further storage container of liquid higher-boiling component through a further variable member, and keeping at a constant amount the total cold content of said storage containers by controlling the variable members between said storage containers and said rectification member.

5. In a method for separating a gaseous mixture comprising the steps of feeding a liquid mixture the composition of which is about that of said gaseous mixture to a storage container of liquefied mixture of said gaseous mixture, feeding said liquid mixture from said storage container through a variable throughput into a rectification member, supplying a higher-boiling component of the liquid mixture in the gaseous state to a variable demand, exchanging said higher-boiling component in the liquid state between said rectification member and a further storage container of liquid higher-boiling component through a further variable throughput, and keeping at a constant amount the total cold content of said storage containers by controlling said variable throughputs between said storage containers and said rectification member.

6. In a method for separating a gaseous mixture comprising the steps of feeding a liquefied fraction of said gaseous mixture to a storage container of liquefied mixture of said gaseous mixture, feeding the liquefied mixture from said storage container through a variable throughput into a rectification member, supplying a higher-boiling component of the liquid mixture in the gaseous state to a variable demand, exchanging said higher-boiling component in the liquid state between said rectification member and a further storage container of liquid higher-boiling component through a further variable throughput, and keeping at a constant amount the total cold content of said storage containers by controlling said variable throughputs between said storage containers and said rectification member.

7. In a method for separating a gaseous mixture by low-temperature liquefaction and rectification in at least two rectification columns under successively lower pressures, comprising the steps of withdrawing a liquid mixture, the composition of which is about that of said gaseous mixture, from a rectification column under a relatively higher pressure and feeding it to a storage container of said liquid mixture, feeding said liquid mixture from said storage container through a variable throughput into another rectification column under low pressure, supplying a higher-boiling component of the liquid mixture in the gaseous state to a variable demand, exchanging said higher-boiling component in the liquid state between said last rectification column and a further storage container of liquid higher-boiling component through a further variable throughput, and keeping at a constant amount the total cold content of said storage containers by controlling the variable liquid throughputs between said storage containers and said rectification columns.

8. In a method for separating a gaseous mixture by low-temperature liquefaction and rectification, comprising the steps of exchanging a higher-boiling component in the liquid state of said gaseous mixture between a rectification column and a storage container of liquid higher-boiling component through a variable throughput, subcooling a liquefied fraction, the composition of which is about that of said gaseous mixture, by indirect heat exchange with said liquid higher-boiling component in said storage container, expanding said liquefied fraction and feeding it to a further storage container of liquid mixture, feeding said liquid mixture from said further storage container into said rectification column through a further variable throughput, supplying a higher-boiling component of said mixture in the gaseous state to a variable demand, and keeping at a constant amount the total cold content of said storage containers by controlling the variable liquid throughputs between said storage containers and said rectification column.

9. In a method for separating air by low-temperature liquefaction and rectification, comprising the steps of feeding a liquid mixture, the composition of which is about that of air, to a storage container of liquid mixture, feeding said liquid mixture from said storage container into a rectification column through a variable throughput, supplying gaseous oxygen to the variable demand, exchanging liquid oxygen between said rectification column and a further storage container of liquid oxygen through a further throughput, and keeping at a constant amount the total cold content of said storage containers by controlling the variable liquid throughputs between said storage containers and said rectification column.

10. A method according to claim 9, wherein said liquid mixture is subcooled by heat exchange with the liquid oxygen in said further storage container before being fed into the storage container of liquid mixture.

11. In a method for separating air by low-temperature liquefaction and rectification, comprising the steps of feeding liquefied air to a storage container of liquid air, feeding liquid air from said storage container into a rectification column through a variable throughput, supplying gaseous oxygen to a variable demand, exchanging liquid oxygen between said rectification column and a further storage container of liquid oxygen through a further variable throughput, and keeping at a constant amount the total cold content of the storage containers of liquefied gases by controlling the variable liquid throughputs between said storage containers and said rectification column.

12. In a method for separating air by low-temperature liquefaction and rectification in at least two rectification columns under successively lower pressures, comprising the steps of withdrawing a liquid mixture, the composition of which is about that of air, from a rectification column under a relatively higher pressure and feeding it to a storage container of liquid mixture, feeding said liquid mixture from said storage container into the rectification column through a variable throughput, supplying gaseous oxygen to a variable demand, exchanging liquid oxygen between another rectification column and a further storage container of liquid oxygen through a further variable throughput, and keeping at a constant amount the total cold content of said storage containers by controlling the liquid throughputs between said storage containers and said rectification columns.

References Cited in the file of this patent

UNITED STATES PATENTS

| | | |
|---|---|---|
| 2,664,718 | Rice | Jan. 5, 1954 |
| 2,708,831 | Wilkinson | May 24, 1955 |
| 2,764,536 | Hutchins | Sept. 25, 1956 |
| 2,788,646 | Rice | Apr. 16, 1957 |
| 2,824,428 | Yendall | Feb. 25, 1958 |
| 2,835,116 | Miller | May 20, 1958 |
| 2,873,583 | Potts et al. | Feb. 17, 1959 |